US010806998B1

(12) United States Patent
Zorzella et al.

(10) Patent No.: US 10,806,998 B1
(45) Date of Patent: *Oct. 20, 2020

(54) USING SIDE CHANNELS IN REMOTE PROCEDURE CALLS TO RETURN INFORMATION IN AN INTERACTIVE ENVIRONMENT

(71) Applicant: Niantic, Inc., San Francisco, CA (US)

(72) Inventors: Luiz Otavio Zorzella, Sunnyvale, CA (US); Alexander Vladimirov, San Francisco, CA (US); Neal Kanodia, Mountain View, CA (US); Chris Hibbert, Mountain View, CA (US); Charles Spirakis, Los Altos, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,517

(22) Filed: Feb. 24, 2017

Related U.S. Application Data

(63) Continuation of application No. 13/955,216, filed on Jul. 31, 2013, now Pat. No. 9,621,635.

(Continued)

(51) Int. Cl.
 *A63F 13/352* (2014.01)
 *A63F 13/216* (2014.01)

(52) U.S. Cl.
 CPC .......... *A63F 13/352* (2014.09); *A63F 13/216* (2014.09); *A63F 2300/8082* (2013.01)

(58) Field of Classification Search
 CPC .................. A63F 13/352; A63F 13/216; A63F 2300/8082

(Continued)

(56) References Cited

U.S. PATENT DOCUMENTS 6,530,841 B2  3/2003  Bull et al.
6,811,084 B2  11/2004  Tatsuta et al.
(Continued)

FOREIGN PATENT DOCUMENTS

EP   1574238 A1   9/2005
EP   2101889 A1   9/2009
(Continued)

OTHER PUBLICATIONS

JSON-RPC Working Group, "JSON-RPC 2.0 Specification", Mar. 26, 2010, retrieved from Internet on Oct. 2, 2017 from URL<http://www.jsonrpc.org/specification>.*

(Continued)

*Primary Examiner* — Jay Trent Liddle
*Assistant Examiner* — Ryan Hsu
(74) *Attorney, Agent, or Firm* — Fenwick & West LLP (57) ABSTRACT

Systems and methods for exchanging information in a distributed computing system implementing an interactive application, such as a location-based parallel reality game, are provided. In particular, the subject matter of the present disclosure provides an alternative approach for providing and processing return results from a remote procedure call (RPC) by which remote computing systems (e.g. a game server and a remote client) send requests and responses to one another. Rather than providing a single return result in response to a single request as in typical remote procedure calls, information about updates to the state of the interactive application, such as updates to game status, can be returned via side channels which are handled generically while passing the main return result of the invoked service directly back to the caller.

22 Claims, 6 Drawing Sheets

Related U.S. Application Data (60) Provisional application No. 61/677,556, filed on Jul. 31, 2012.

(58) Field of Classification Search
USPC .......................................................... 463/42
See application file for complete search history.

(56) References Cited

U.S. PATENT DOCUMENTS

| | | | |
|---|---|---|---|
| 7,275,994 | B2 | 10/2007 | Eck et al. |
| 7,435,179 | B1 | 10/2008 | Ford |
| 7,491,123 | B2 | 2/2009 | Smith |
| 7,546,613 | B2 | 6/2009 | Ikeda et al. |
| 7,564,469 | B2 | 7/2009 | Cohen |
| 7,647,415 | B1 | 1/2010 | Sandoz et al. |
| 7,809,848 | B1 * | 10/2010 | McDougall ............ H04L 67/40 709/230 |
| 7,937,703 | B2 | 5/2011 | Bethea et al. |
| 7,946,919 | B2 | 5/2011 | Piccionelli |
| 7,970,749 | B2 | 6/2011 | Uhlir et al. |
| 8,002,617 | B1 | 8/2011 | Uskela et al. |
| 8,070,608 | B2 | 12/2011 | Uhlir et al. |
| 8,108,459 | B1 | 1/2012 | Hoffman et al. |
| 8,190,733 | B1 | 5/2012 | Hoffman et al. |
| 8,267,794 | B2 | 9/2012 | Van Luchene |
| 8,287,383 | B1 | 10/2012 | Etter et al. |
| 8,291,016 | B1 | 10/2012 | Whitney et al. |
| 8,308,568 | B2 | 11/2012 | Amaitis et al. |
| 8,366,446 | B2 | 2/2013 | Kreiner et al. |
| 8,751,668 | B2 * | 6/2014 | Kulkarni ............ H04L 63/0227 709/228 |
| 8,832,183 | B2 | 9/2014 | Takano et al. |
| 8,886,787 | B2 | 11/2014 | Martchenko |
| 8,968,099 | B1 | 3/2015 | Hanke et al. |
| 9,032,002 | B2 | 5/2015 | Hanson et al. |
| 9,367,371 | B2 | 6/2016 | Ni et al. |
| 2001/0009867 | A1 | 7/2001 | Sakaguchi et al. |
| 2002/0090985 | A1 | 7/2002 | Tochner et al. |
| 2003/0036428 | A1 | 2/2003 | Aasland |
| 2003/0224855 | A1 | 12/2003 | Cunningham |
| 2004/0029625 | A1 | 2/2004 | Annunziata |
| 2004/0058732 | A1 | 3/2004 | Piccionelli |
| 2004/0235563 | A1 * | 11/2004 | Blackburn ............ G07F 17/323 463/29 |
| 2004/0255268 | A1 | 12/2004 | Meijer et al. |
| 2005/0044197 | A1 * | 2/2005 | Lai ..................... H04L 67/16 709/223 |
| 2005/0049022 | A1 | 3/2005 | Mullen |
| 2005/0063335 | A1 * | 3/2005 | Shenfield ............ H04L 67/26 370/329 |
| 2005/0080930 | A1 | 4/2005 | Joseph |
| 2006/0023674 | A1 * | 2/2006 | Goring ................ H04L 47/50 370/338 |
| 2006/0105838 | A1 | 5/2006 | Mullen |
| 2006/0143239 | A1 | 6/2006 | Battat et al. |
| 2006/0258420 | A1 | 11/2006 | Mullen |
| 2006/0281553 | A1 | 12/2006 | Hawkins et al. |
| 2006/0284789 | A1 | 12/2006 | Mullen |
| 2006/0287026 | A1 | 12/2006 | Mullen |
| 2007/0021166 | A1 | 1/2007 | Mattila |
| 2007/0060408 | A1 | 3/2007 | Schultz et al. |
| 2007/0104348 | A1 | 5/2007 | Cohen |
| 2007/0149284 | A1 | 6/2007 | Plavetich et al. |
| 2007/0281765 | A1 | 12/2007 | Mullen |
| 2007/0281766 | A1 | 12/2007 | Mullen |
| 2008/0015018 | A1 | 1/2008 | Mullen |
| 2008/0015024 | A1 | 1/2008 | Mullen |
| 2008/0146338 | A1 | 6/2008 | Bell et al. |
| 2009/0005140 | A1 | 1/2009 | Rose et al. |
| 2009/0017913 | A1 | 1/2009 | Bell et al. |
| 2009/0024986 | A1 | 1/2009 | Meijer et al. |
| 2009/0281851 | A1 | 11/2009 | Newton et al. |
| 2010/0113157 | A1 * | 5/2010 | Chin ..................... A63F 13/12 463/42 |
| 2010/0287011 | A1 | 11/2010 | Muchkaev |
| 2010/0331089 | A1 | 12/2010 | Priebatsch et al. |
| 2011/0004658 | A1 | 1/2011 | Chesley et al. |
| 2011/0081973 | A1 | 4/2011 | Hall |
| 2011/0300947 | A1 | 12/2011 | Guo et al. |
| 2011/0319148 | A1 | 12/2011 | Kinnebrew et al. |
| 2012/0040745 | A1 | 2/2012 | Auterio et al. |
| 2012/0052953 | A1 | 3/2012 | Annambhotla et al. |
| 2012/0094770 | A1 | 4/2012 | Hall |
| 2012/0157210 | A1 | 6/2012 | Hall |
| 2012/0185892 | A1 | 7/2012 | Camplejohn et al. |
| 2012/0190452 | A1 | 7/2012 | Weston et al. |
| 2012/0226627 | A1 | 9/2012 | Yang |
| 2012/0231887 | A1 | 9/2012 | Lee et al. |
| 2012/0233258 | A1 | 9/2012 | Vijayaraghavan et al. |
| 2012/0246104 | A1 | 9/2012 | Di Sciullo et al. |
| 2012/0315992 | A1 | 12/2012 | Gerson et al. |
| 2013/0004932 | A1 | 1/2013 | Mahajan et al. |
| 2013/0005475 | A1 | 1/2013 | Mahajan et al. |
| 2013/0005480 | A1 | 1/2013 | Bethke et al. |
| 2013/0072308 | A1 * | 3/2013 | Peck ..................... A63F 13/65 463/42 |
| 2013/0117326 | A1 | 5/2013 | De Smet et al. |
| 2013/0151655 | A1 | 6/2013 | Wu |
| 2013/0160064 | A1 * | 6/2013 | van Rozen ....... H04N 21/43615 725/110 |
| 2013/0178257 | A1 | 7/2013 | Langseth |
| 2015/0199222 | A1 | 7/2015 | Day-Richter |

FOREIGN PATENT DOCUMENTS

| | | |
|---|---|---|
| EP | 2393056 A1 | 12/2011 |
| EP | 2416289 A1 | 2/2012 |
| WO | WO 2002/062436 A2 | 8/2002 |

OTHER PUBLICATIONS

Matyas, "Playful Geospatial Data Acquisition by Location-Based Gaming Communities", The International Journal of Virtual Reality, 2007, vol. 6, No. 3, pp. 1-10.

\* cited by examiner

USING SIDE CHANNELS IN REMOTE PROCEDURE CALLS TO RETURN INFORMATION IN AN INTERACTIVE ENVIRONMENT

PRIORITY CLAIM

This application is a continuation application of U.S. patent application Ser. No. 13/955,216, filed on Jul. 31, 2013, which claims the benefit of U.S. provisional application 61/677,556, filed on Jul. 31, 2012. Each application is incorporated by reference herein in its entirety.

FIELD

The present disclosure relates generally to exchanging information over a distributed computing system, and more particularly, to a system and method for exchanging information between a server and a client device in a client-server architecture associated with an interactive application, such as a computer-implemented gaming application.

BACKGROUND

In interactive applications such as multiplayer games, many activities associated with the interactive application can be taking place simultaneously. In interactive applications implemented across a distributed computing system (e.g. a client-server architecture), updates about the state of the interactive application need to be periodically provided across the system. For instance, in the context of a location-based parallel reality game, game modules running on client devices used by players may need to invoke certain program elements or services on a game server to return results to the game module.

Many tools exist for invoking program elements/services on remote computing devices to return results to a caller. These tools typically support returning a single return result or value for each particular message sent between the system. This is true for many frameworks, including remote procedure call (RPC) frameworks and other frameworks. These tools typically do not provide a simple way to notify the caller about other things that may have happened in the interactive environment while also returning the result of the particular action the caller was trying to perform. As a result, client devices in an interactive application typically have to make periodic calls to receive updates for the interactive application. This can be inefficient in a distributed interactive application where a client device needs to frequently receive updates from a server in order to properly interact with the application.

Approaches for providing updates in an interactive application include returning multiple values in response to multiple requests to the invoker of the action (i.e. the module or program initiating the call). This approach requires the invoker of an action to explicitly handle all the returned data. This does not provide much flexibility in how the returned data is handled by the caller. For instance, each module or program that initiates a call and receives updates other than those directly relevant to the call has to pass the extra updates on to a special purpose handler. In addition, calls that do not end in success may not be able to provide updates as a typical return style does not provide a mechanism to provide updates. In particular, in a typical return style, returning an exception typically excludes returning a value.

SUMMARY

Aspects and advantages of embodiments of the invention will be set forth in part in the following description, or may be obvious from the description, or may be learned through practice of the embodiments.

One exemplary aspect of the present disclosure is directed to a computer-implemented method for exchanging information in a distributed computing system implementing an interactive application, such as a location-based gaming application. The method includes receiving, at a server, a request to invoke a service at the server and processing the request at the server to generate a return result for the request. The return result can be a return value, an error code, an exception, or other suitable information. The method further includes populating a side channel class to instantiate a side channel class data object. The side channel data object has one or more updates for the interactive system. At least one of the one or more updates can be non-responsive to the request. The method further includes wrapping the return result and the side channel class data object in a return result data object for responding to the request. The return result data object includes the return result and the side channel data object. In a particular implementation the return result data object can be common return type for all requests received at the server.

Another exemplary aspect of the present disclosure is directed to a computer-implemented method for exchanging information in a distributed computing system implementing an interactive application. The method includes providing, from a computing device, a request to invoke a service at a remote computing device and receiving, at the computing device, a response to the request. The response includes a return result data object. The return result data object can include a return result and a side channel data object. The side channel data object includes one or more updates for the interactive system. The updates can be non-responsive to the request for the interactive system.

Other exemplary implementations of the present disclosure are directed to systems, apparatus, non-transitory computer-readable media, and devices to exchanging information in a distributed computing system used to implement an interactive application, such as a distributed computing system used to implement a location-based parallel reality game.

These and other features, aspects and advantages of various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the invention. For instance, features illustrated or described as part of one embodiment can be used with another embodiment to yield a still further embodiment. Thus, it is intended that aspects of the present disclosure cover such modifications and variations.

Overview

Generally, the present disclosure is directed to a system and method for exchanging information in a distributed computing system implementing an interactive application, such as a location-based parallel reality game. The present disclosure will be discussed with reference to exchanging information in a distributed computing system implementing a location-based parallel reality game for purposes of illustration and discussion. Those of ordinary skill in the art, using the disclosures provided herein, should understand that the systems and methods for exchanging information can be used in any suitable application.

The subject matter of the present disclosure provides an alternative approach for providing and processing return results from a remote procedure call (RPC) by which remote computing systems (e.g. a game server and a remote client) send requests and responses to one another. Rather than providing a single return result in response to a single request as in typical remote procedure calls, information about updates to the state of the interactive application, such as updates to game status, can be returned via side channels which are handled generically while passing the main return result of the invoked service directly back to the calling method or module. As used herein, the term "service" includes any program, method, code, module, operation, data, or process that is invoked as part of call.

A typical approach for an RPC call consisting of a single request is to return a single value, which is mapped from the single value result in the programming language in which the invoked service was written. In order to decouple the processing between remote computing devices (e.g. server and client) that are separated from one another and that may be implemented in different languages, the requests and responses are serialized from computer memory data objects to wire format (e.g. language-independent strings of bits suitable for transmission) and deserialized from wire format back to local memory data objects. Typical RPC serialization/deserialization approaches also support the return of a single value in response to a single request. Moreover, many programming languages, such as Java, can raise an exception instead of returning a normal value or an error code in response to a request. The restriction to a single typed return value can create hurdles for returning details about failure conditions.

According to exemplary aspects of the present disclosure, information and/or updates that need to be frequently provided to a client in an interactive system, such as a location-based parallel reality game, is wrapped with the return result of a request into a single data object, such as a return result data object. The return result data object can be specified as a common data type for all requests. Wrapping the responsive information and any other information, such as game updates, which may be non-responsive to the request into a single data object allows for compatibility with many programming paradigms that expect a single return value or return type in response to a single request.

In a particular implementation, the single return result data object contains the return result of the invoked service in addition to a side channel data object. The return result can include a return value, an exception, an error code or other suitable information or data that indicates the return result of the request made by the client. The side channel data object can be populated with information, typically information that is not necessarily responsive to the request, associated with the interactive application that needs to be frequently provided to the client to keep the client up to date on the status of the interactive application. The side channel data object can be generated by populating a side channel class having fields associated with relevant information to instantiate the side channel data object. In one example, the side channel data object can be populated with information about the current status of the interactive application, consequences to the client of the current action, consequences to the client of actions by other clients, consequences to the player of actions by the server, messages intended for the user of the client, objects that are no longer present in the interactive application, and other suitable information.

According to aspects of the present disclosure, the information provided in the side channel data object can be processed out-of-band in a general fashion by a generic handler, such as the program or module responsible for deserializing the response. More particularly, it can be inefficient for the program or module that implements a particular call to handle the generic information returned via the side channel data object. To address this concern, a generic handler can be implemented that unwraps the return result data object, hands the side channel data object off for processing in a generic fashion, and then returns the return result (either a return value, error code, or exception) to the program or module that made the specific call initiating the request. In this regard, the subject matter of the present disclosure can have a technical effect of providing for the efficient exchange and processing of information about updates to the state of the interactive application in parallel with the main return result of the invoked service.

In a particular implementation, the interactive application can be a location-based game, such as a location-based parallel reality game. The location-based game can include a game server in communication with a plurality of client devices used by players to play the location-based game. The game server can provide updates on game status through side channels in RPC communications every time a game server makes a request to the game server for information. In this manner, game updates can be efficiently provided to the client devices to keep the players current on the status of the game. For instance, information such as the state of the game board (i.e. the virtual world associated with the location-based game), consequences to the player of the current action, consequences to the player of actions by other players, consequences to the player of actions by the game itself, messages intended for the player, objects that are no longer present, and other suitable game information can be provided to the player every time the client device associated with the player implements a call to invoke a service or other request to the game server.

Exemplary Location-Based Parallel Reality Gaming System

Exemplary computer-implemented location-based gaming systems implementing information exchange techniques according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems and interactive applications. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices.

Figure 1:
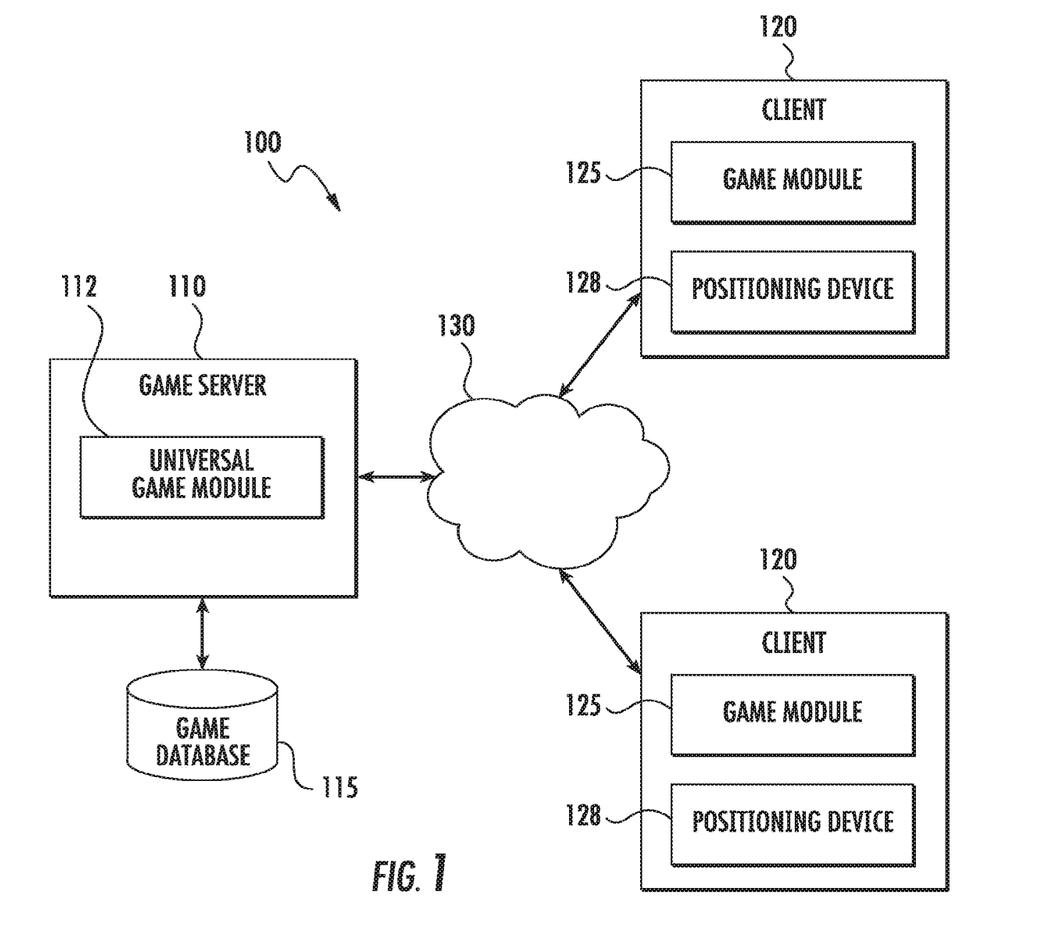
FIG. 1 depicts an exemplary computer-based system for implementing a location-based game according to an exemplary embodiment of the present disclosure.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
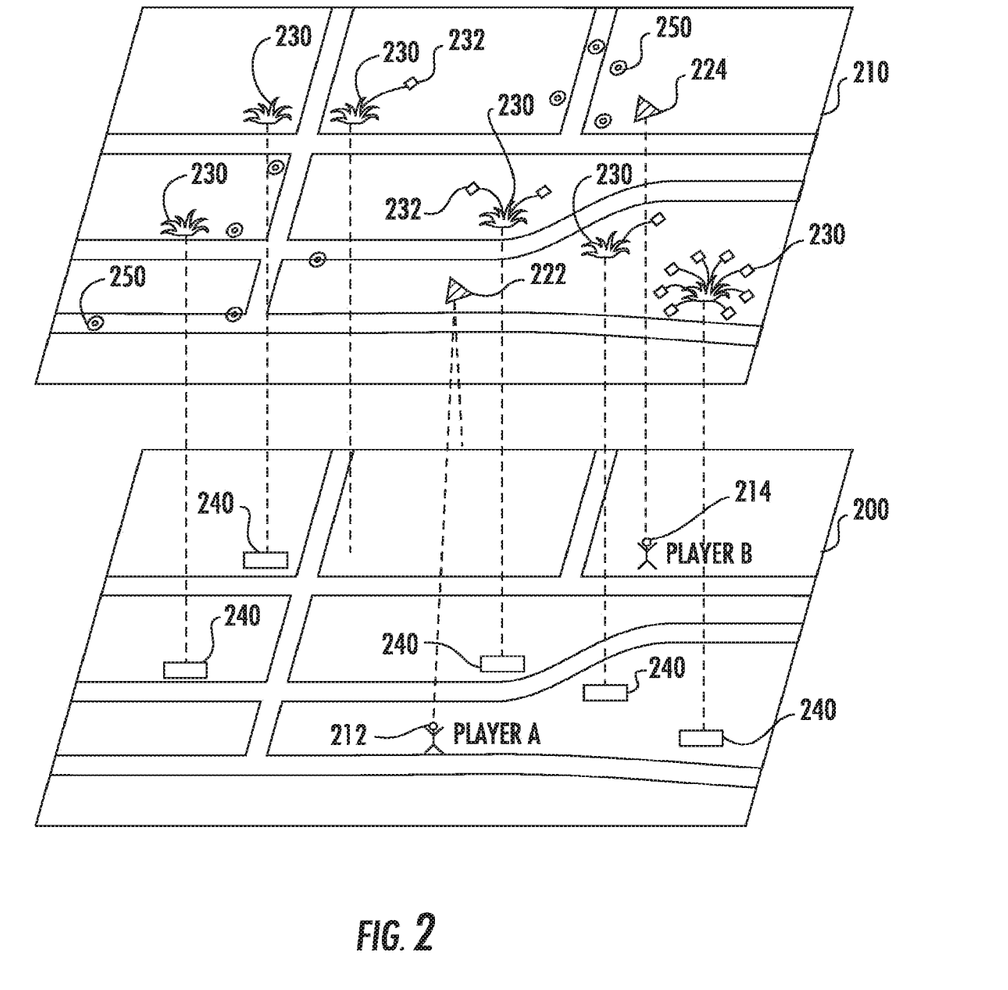
FIG. 2 depicts a representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal game module 112 that controls aspects of the location-based game for all players and receives and processes each player's input in the location based game. On the client-side, each client 120 can include a game module 125 that operates as a gaming application so as to provide a user with an interface to the system 100. The game server 110 transmits game data over the network 130 to the client 120 for use by the game module 125 at the client 120 to provide local versions of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include one or more processors and one or more computer-readable media. The computer-readable media can store instructions which cause the one or more processors to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

The game server 110 can be configured to receive requests for game data and other information) from one or more clients 120 (for instance, via remote procedure calls (RPCs)) and to respond to those requests via the network 130. For instance, the game server 110 can encode game data in one or more data files and provide the data files to the client 120. As will be discussed in more detail below, the game server 110 can respond to a request with a return result data object that includes information responsive to a particular request as well as a side channel data object containing information about updates to the game. The game server 110 can be configured to receive game data (e.g. player positions, player actions, player input, etc.) from one or more clients 120 via the network 130. For instance, the client device 120 can be configured to periodically send player input, player location, and other updates to the game server 110, which the game server 110 uses to update game data in the game database 115 to reflect any and all changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data and information to the clients 120 over the network 130. For instance, the universal game module 112 can manage responses to RPCs made by game modules 125 running on client devices 120.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system, wearable computing device, a display having one or more processors or other such device. In short, a client 120 can be any computer-device or system that can execute a game module 125 to allow a player to interact with the game system 100.

The client 120 can include one or more processors and one or more computer-readable media. The computer-readable media can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130. The network interface can include any suitable components for interfacing with one more networks, including for example, transmitters, receivers, ports, controllers, antennas, or other suitable components.

The game module 125 executed by the client 120 provides an interface between a player and the location-based game. The game module 125 can present a user interface on a display device associated with the client 120 that displays a virtual world associated with the game and allows a user to interact in the virtual world to perform various game objectives. The game module 125 can also control various other outputs to allow a player to interact with the game without requiring the player to view a display screen. For instance, the game module 125 can control various audio, vibratory, or other notifications that allow the player to play the game without looking at the display screen. The game module 125 can access game data received from the game server 110 to provide an accurate representation of the game to the user. The game module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the game module 125. The game module 125 updates the player position in the virtual world based on the actual position of the player in the real world. In particular, the location of the player in the virtual world can correspond to the location of the player in the real world. The game module 125 can provide player position information to the game server 110 over the network 130 such that the universal game module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
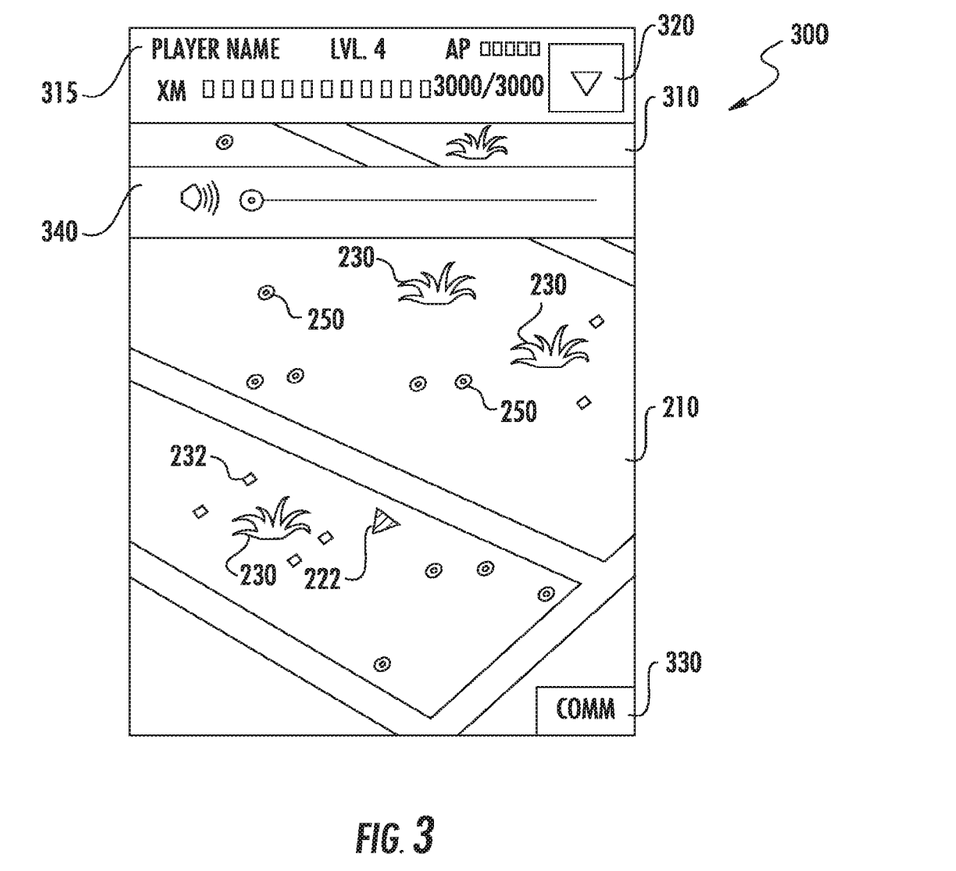
FIG. 3 depicts an exemplary game interface of a location-based game according to an exemplary embodiment of the present disclosure.

FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Using Side-Channels in Response to Calls to Return Additional Data

Figure 4:
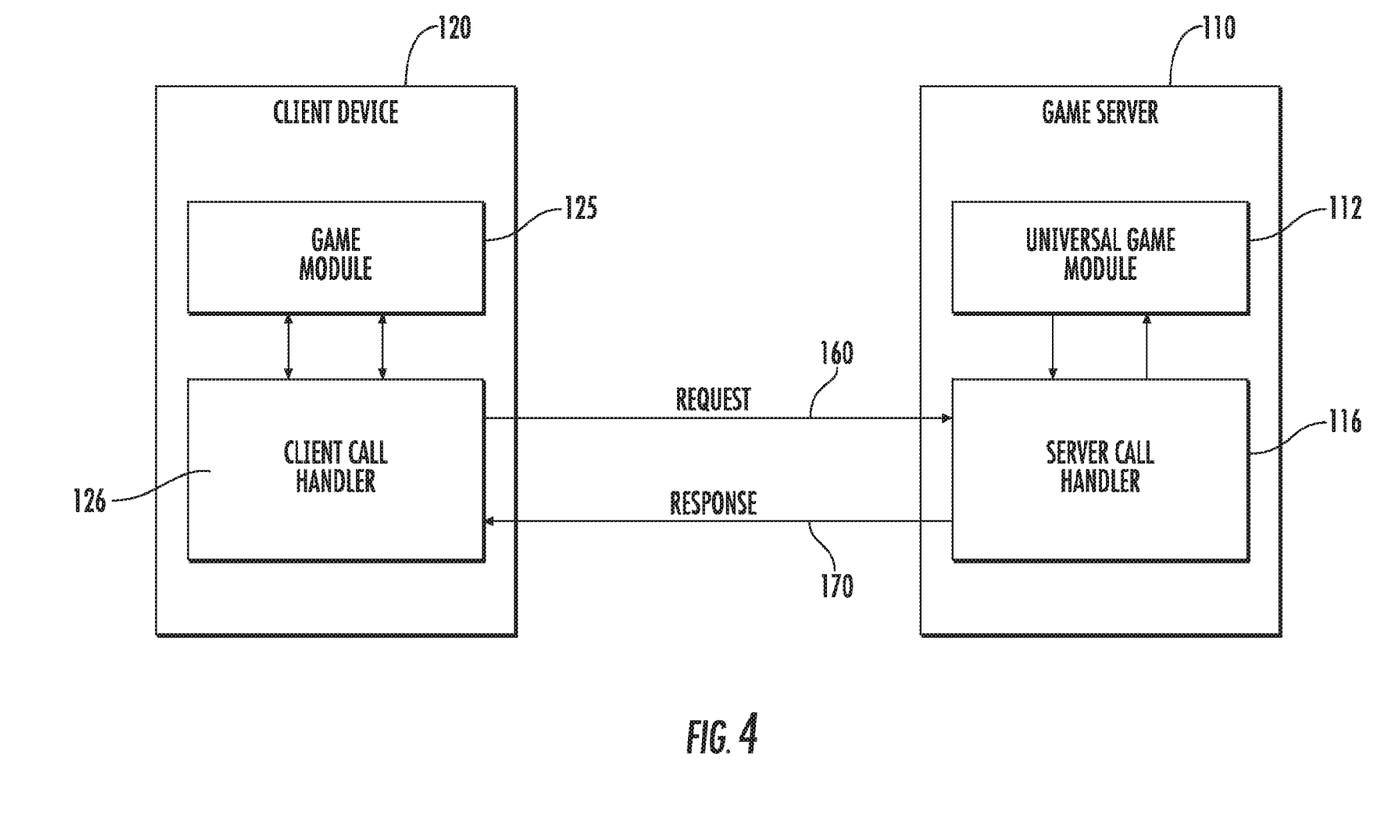
FIG. 4 depicts a block diagram illustrating an exemplary communication between a client device and a game server according to an exemplary embodiment of the present disclosure.

FIG. 4 depicts a block diagram illustrating the exemplary exchange of information between a game server 110 and a client device 120 according to an exemplary aspect of the present disclosure. For purposes of illustration and discussion, FIG. 4 is illustrated with reference to client device 120 initiating a call to invoke a service (e.g., program, code, or module) at the game server 110. However, those of ordinary skill in the art, using the disclosures provided herein, should understand that the teachings of the present disclosure are similarly applicable to the game server 110 initiating a call to invoke a service (e.g. program, code, or module) at the client 120.

The game module 125 executed on the client 120 initiates a call to invoke a service on the game server 110. For instance, the game module 125 may need to fetch data stored at the server 110 and/or in at the game database 115 associated with the game server 110. The game module 125 may also need to perform an action in the game context. The game module 125 can initiate the call by generating a request 160. The request 160 can be encoded as a data object written in any suitable language, such as Java. The request 160 can be provided to a client call handler 126 which serializes the request 160 into a suitable wire format for transmission to the game server 110 over the network, e.g. network 130. An exemplary wire format can include JSON (JavaScript Object Notation) format.

Once the request is received at the game server 110, a server call handler 116 can deserialize the request 160 and pass the request 160 to the universal game module 112 which returns a return result responsive to the request. The return result can be a return value, an error code, an exception, or other information responsive to the request. The return result can be encoded as a data object and passed to the server call handler 116. The server call handler 116 can be configured to wrap the return return result into a return result data object that contains the return result of the call in addition to a side channel data object which can carry side channel information desired to be provided to the client 120 in parallel with the return result responsive to the request.

The return result data object can be encoded in any data format. In one implementation, the return result data object is defined in a format that allows type parameters, such as Java. A return result data object can take two type parameters-one describing the invoked services return type and one describing the type of possible error codes. An exemplary return result class definition in Java for defining return result data objects is provided below:

public final class RpcResult <R, E>{
private final R result;
private final E error;
private final String exception;
private GameBasket gameBasket;
}

R is the type of the return value. E is the type of Error code. Only one of result, error and exception can be non-null in any return result data object because exceptions interrupt the returning of a value and errors are returned to give a reason for not successfully completing the call and returning a value. In certain cases, the return value can be null (particularly if the invoked service is declared void, meaning it always returns nothing). As a result a handler or the module initiating the call can check that error and exception are null to be sure that a call was a success.

GameBasket is the side channel data object communicating information concerning updates to the location-based parallel reality game. The information provided in the side channel data object can be non-responsive to the request. GameBasket can be populated by instantiating a side channel class with game information desired to be returned in parallel with return result. The game information can include data representing the consequence of the particular call on the player, updates to the game state, the updated state of the current player, objects that were known to the client and deleted on the server, changes to global game rules, the state of the game board, consequences to the player of actions by other players, consequences to the player of actions by the game itself, messages intended for the player, and other suitable information.

Before transmitting the return result data object back to the client device 120 over the network, the server call handler 116 can serialize the return result data object into a suitable wire format. In one exemplary implementation, the server call handler 116 can serialize the return result data object in JSON format. The JSON return result data object can include a plurality of fields, one for each of the return result, error code, and exception and a plurality of fields associated with each parameter or value specified in the side channel data object. Other suitable wire formats can be used without deviating from the scope of the present disclosure.

The client call handler 126 receives the response 170 including the serialized return result data object and deserializes the response 170 into a format suitable for the game module 125. Preferably, the game module 125 or other module that initiates the particular call does not have to handle the information being returned in the side channel data object. Rather, the client call handler 126 (which can be responsible for serializing and deserializing information) can be configured to unwrap return result data object and hand the side channel data object off for processing in a generic fashion. The client call handler 126 can then return the return result (e.g. the return value, error code, or exception) to the code in the game module 125 that initiated the call. This allows the code on the client side to look like it is invoking the service on the server side directly, using the same declared function signature that the service on the server side declares.

Exemplary Client-Server Flow Diagram

Figure 5A:
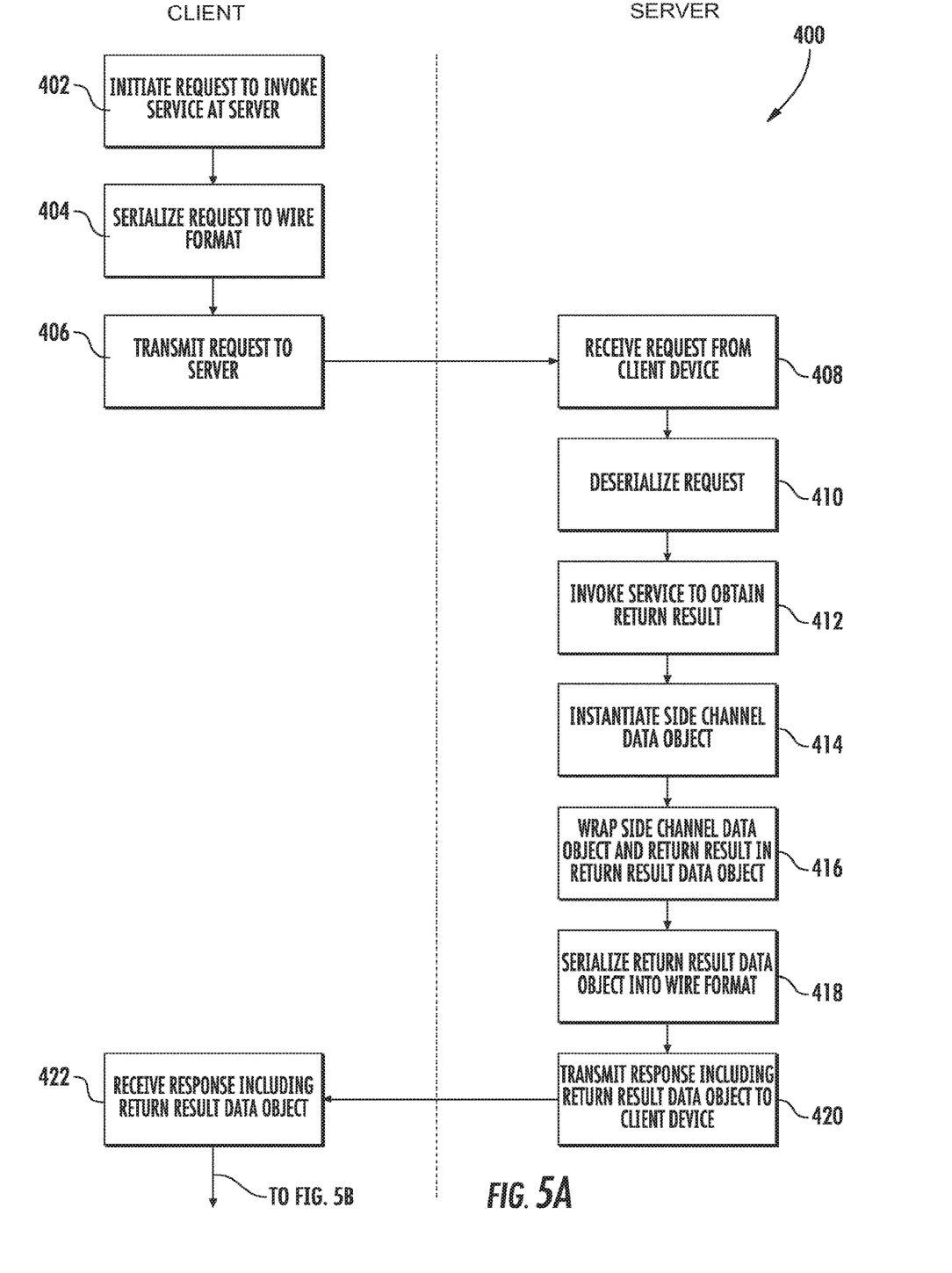
FIGS. 5A and 5B depict a flow diagram of an exemplary method according to an exemplary embodiment of the present disclosure.
Figure 5B:
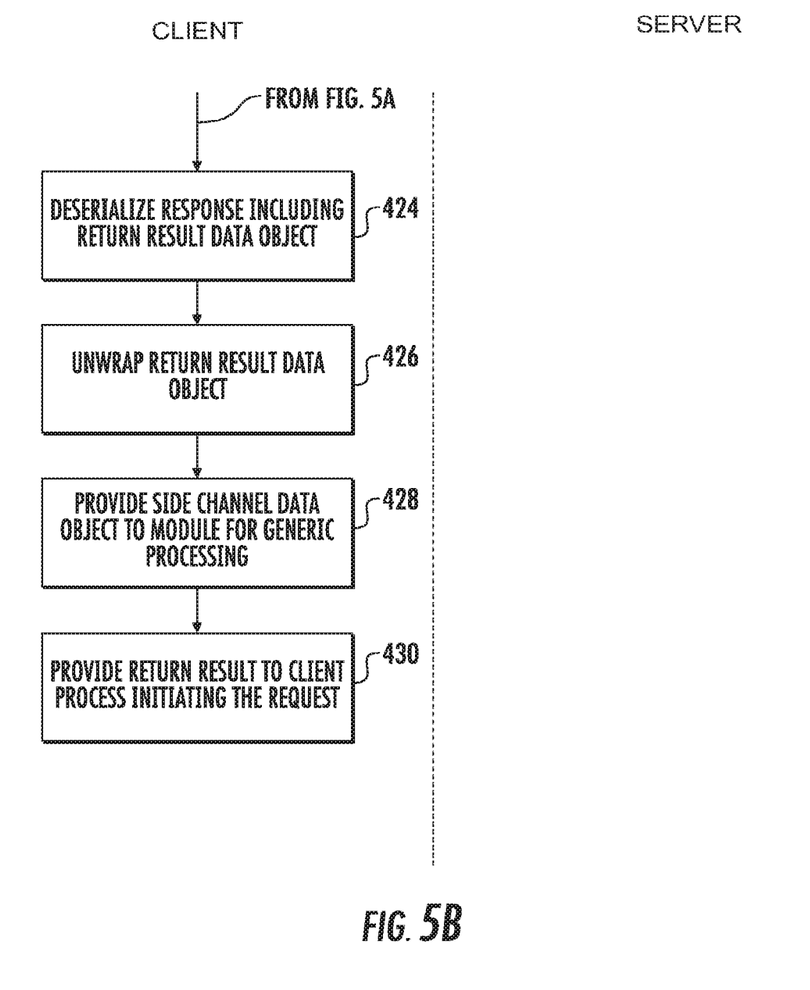

FIGS. 5A and 5B depict an exemplary client-server flow diagram of an exemplary method (400) for exchanging information in a distributed computing system implementing an interactive application, such as a location-based game, according to an exemplary embodiment of the present disclosure. The exemplary method (400) can be implemented using any suitable computing system, such as the client device 120 and game server 110 of FIG. 4. In addition, although FIGS. 5A and 5B depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (402), the method initiates a request to invoke a service at the server. For instance, a process executed as part of game module 125 on a client device 120 can initiate a request to invoke a service at the game server 110. The request is then serialized into a suitable wire format (404) and transmitted to the server (406). For instance, the request is serialized and transmitted from the client device 120 to the game server 110 over the network 130.

The server receives the request (408) and deserializes the request (410). The server then invokes the service subject to the request to obtain a return result (412). For instance, the game server invokes a service running as part of the universal game module 112 to obtain a return result. The return result can be a return value, an error code, an exception, or other suitable information responsive to the request. At (414), the server instantiates a side channel class to obtain a side channel class data object. The side channel class data object can be populated with information about the status of the location based game that is desired to be provided to the client device. For instance, the side channel class data object can be populated with data representing the consequence of the particular call on the player, updates to the game state, the updated state of the current player, objects that were known to the client and deleted on the server, changes to global game rules, the state of the game board, consequences to the player of actions by other players, consequences to the player of actions by the game itself, messages intended for the player, and other suitable information. At (414), the server can wrap the side channel data object and the return result into a return result data object. The return result data object can have a common type responsive to all requests. The return result data object can be serialized at the server into an appropriate wire format (418), such as a JSON format, and transmitted from the server to the client over the network (420).

At (422) the client device receives the response including the return result data object from the server. Referring to FIG. 5B, the client device can then deserialize the response (424). The handler at the client responsible deserializing the response can then unwrap return result data object (426) and provide the side channel data object to a module for generic processing at the client device (428). The handler can then provide the return result to the client process initiating the request (430).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing updated status information for an interactive application that includes a plurality of services provided by a server and processes executed on a client device in a distributed computing system, the method comprising:

receiving, by the server from the client device, requests to invoke a specific service of the plurality of services of the interactive application, each request initiated by a first process of the interactive application, executing on the client device, using a protocol supporting a single return result returned to the first process in response to the request;

invoking, by the server in response to a first request of the requests, the specific service to generate a return result that is responsive to the first request;

generating, by the server, a side channel data object comprising one or more updates to the interactive application to be returned in parallel with the return result, the updates containing information about a current status of the interactive application, at least one of the updates having not been generated by the specific service invoked by the requests;

wrapping, by the server, the return result and the side channel data object in a return result data object, the return result data object comprising the return result destined for the first process in response to the first request and the side channel data object destined for a second process of the interactive application executing on the client device, the second process different than the first process; and transmitting, by the server to the client device, the return result data object as a response to the first request from the client device.

2. The computer-implemented method of claim 1, wherein the return result data object includes four variables, a return value, an error code, an exception, and the side-channel data object, wherein only one of the return value, the error code, and the exception can be non-null.

3. The computer-implemented method of claim 2, wherein the return result data object has two parameters, a first parameter describing a return type of the specific service invoked by the request and a second parameter describing a type of possible error codes.

4. The computer-implemented method of claim 1, wherein the return result data object is a common return type for the requests received by the server.

5. The computer-implemented method of claim 1, further comprising serializing the return result data object into a wire format prior to transmitting the return result data object to the client device.

6. The computer-implemented method of claim 5, wherein the wire format comprises a JSON wire format.

7. The computer-implemented method of claim 1, wherein the interactive application is a location-based parallel reality game.

8. The computer-implemented method of claim 1, wherein the return result is null responsive to the specific service invoked by the request being declared void.

9. The computer-implemented method of claim 1, wherein the updates were generated independently from the specific service invoked by the request.

10. The computer-implemented method of claim 1, further comprising:

hosting, by the server, a universal application module that is the authoritative source for a current status of the interactive application, wherein the requests to invoke the specific service are received while the universal application module is executing on the server.

11. A computer-implemented method comprising:

transmitting, by a computing device to a computer system, requests to invoke a specific service at the computer system, each request initiated by a first process of an interactive application, executing on the computing device, using a protocol supporting a single return result returned to the first process in response to the request;

receiving, by the computing device from the computer system as a response to a first request of the requests, a return result data object including a return result and, in parallel with the return result data object, a side channel data object, the return result generated by the computer system for the first request, the side channel data object comprising one or more updates to the interactive application, wherein at least one of the updates was not generated by the specific service invoked by the requests;

identifying, by the computing device, the return result and the side channel data object included in the return result data object;

providing, by the computing device, the return result to the first process; and providing, by the computing device, the side channel data object to a second process of the computing device, the second process different than the first process, the side channel data object including data enabling the interactive application to have up-to-date status information at the computing device.

12. The computer-implemented method of claim 11, wherein the return result data object includes four variables, a return value, an error code, an exception, and the side-channel data object, wherein only one of the return value, the error code, and the exception can be non-null.

13. The computer-implemented method of claim 11, wherein the return result data object is in a wire format.

14. The computer-implemented method of claim 13, wherein the return result data object is in a JSON wire format.

15. The computer-implemented method of claim 11, wherein the interactive application is a location-based parallel reality game.

16. A non-transitory computer-readable storage medium storing computer-readable instructions for providing updated status information for an interactive application that includes a plurality of services provided by a server and processes executed on a client device in a distributed computing system, the instructions, when executed by one or more processors, causing the one or more processors to perform operations comprising:

receiving, from the client device, requests to invoke a specific service of the of the plurality of services of the interactive application, the requests initiated by a first process of the interactive application, executing on the client device, using a protocol supporting a single return result returned to the first process in response to the requests;

invoking, in response to a first request of the requests, the specific service to generate a return result that is responsive to the first request;

generating a side channel data object comprising one or more updates to the interactive application to be returned in parallel with the return result, the updates containing information about a current status of the interactive application, wherein at least one of the updates is non-responsive to any of the requests it invoke the specific service received from the client device;

wrapping the return result and the side channel data object in a return result data object, the return result data object comprising the return result destined for the first process in response to the first request and the side channel data object destined for a second process interactive application executing on the of the client device, the second process different than the first process; and transmitting to the client device the return result data object as a response to the first request from the client device.

17. The non-transitory computer-readable storage medium of claim 16, wherein the return result data object includes four variables, a return value, an error code, an exception, and the side-channel data object, wherein only one of the return value, the error code, and the exception can be non-null.

18. The non-transitory computer-readable storage medium of claim 17, wherein the return result data object has two parameters, a first parameter describing a return type of the specific service invoked by the request and a second parameter describing a type of possible error codes.

19. The non-transitory computer-readable storage medium of claim 16, wherein the return result data object is a common return type for a plurality of requests received by the server.

20. The non-transitory computer-readable storage medium of claim 16, wherein the computer-readable instructions further cause the one or more processors to perform operations comprising serializing the return result data object into a wire format prior to transmitting the return result data object to the client device.

21. The non-transitory computer-readable storage medium of claim 20, wherein the wire format comprises a JSON wire format.

22. The non-transitory computer-readable storage medium of claim 16, wherein the interactive application is a location-based parallel reality game.

* * * * *

UNITED STATES PATENT AND TRADEMARK OFFICE
CERTIFICATE OF CORRECTION

PATENT NO. : 10,806,998 B1
APPLICATION NO. : 15/442517
DATED : October 20, 2020
INVENTOR(S) : Zorzella et al.

Page 1 of 1

It is certified that error appears in the above-identified patent and that said Letters Patent is hereby corrected as shown below:

In the Claims

In Column 16, in Claim 16, Line 29, delete "of the of the" and insert -- of the --, therefor.

In Column 16, in Claim 16, Line 43, after "requests" delete "it" and insert -- to --, therefor.

In Column 16, in Claim 16, Line 51, after "on the" delete "of the".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*